United States Patent [19]
Mäyrä-Mäkinen et al.

[11] Patent Number: 5,908,646
[45] Date of Patent: Jun. 1, 1999

[54] INHIBITION OF CLOSTRIDIA WITH LACTIC ACID BACTERIA

[75] Inventors: Annika Mäyrä-Mäkinen; Tarja Suomalainen, both of Helsinki, Finland

[73] Assignee: Valio Oy, Helsinki, Finland

[21] Appl. No.: 08/770,900

[22] Filed: Dec. 20, 1996

Related U.S. Application Data

[63] Continuation of application No. 08/404,571, Mar. 15, 1995, abandoned.

[30] Foreign Application Priority Data

Aug. 25, 1994 [FI] Finland ..................................... 943905

[51] Int. Cl.$^6$ ....................................................... A23C 9/12
[52] U.S. Cl. ................................. 426/36; 426/34; 426/61; 426/330.2; 426/334; 426/580; 426/582
[58] Field of Search .................................... 426/7, 18, 32, 426/33, 34, 36, 44, 602, 61, 131, 330, 334, 580, 582, 657, 660, 330.2

[56] References Cited

U.S. PATENT DOCUMENTS

| | | | |
|---|---|---|---|
| 4,678,673 | 7/1987 | Marshall et al. | 426/46 |
| 4,956,177 | 9/1990 | King et al. | 424/93 |
| 5,378,458 | 1/1995 | Mäyrä-Mäkinen et | 424/93 |

FOREIGN PATENT DOCUMENTS

| | | |
|---|---|---|
| 0 221 499 A2 | 5/1987 | European Pat. Off. . |
| 0 302 300 | 2/1989 | European Pat. Off. . |
| 0 333 056 A2 | 9/1989 | European Pat. Off. . |
| 0 344 786 A3 | 12/1989 | European Pat. Off. . |
| 0 576 780 | 1/1994 | European Pat. Off. . |
| 0 580 236 A2 | 1/1994 | European Pat. Off. . |
| 3125797 A1 | 1/1983 | Germany . |

OTHER PUBLICATIONS

Sasaki et al., JP–04–264034, Sep. 1992, Patent Abstracts of Japan.

W. Kundrat, "On Prevention of Late Blowing of Hard Cheeses by Biological Methods", *Alimenta*, 5:170–175 (1971).

W. Kundrat, "Zur Bekampfung der Spatblahung bei Hartkasen auf biologischem Wege", *Alimenta*, 5:167–180 (1971).

Lee et al, "Influence of Homofermentative Lactobacilli on Physicochemical and Sensory Properties of Cheddar Chees", *Journal of Dairy Science*, 55(2):386–990 (1990).

*Primary Examiner*—Leslie Wong
*Attorney, Agent, or Firm*—Burns, Doane, Swecker & Mathis, L.L.P.

[57] ABSTRACT

The invention relates to inhibition of clostridia with lactic acid bacteria. In particular, the invention relates to the use of *Lactobacillus rhamnosus* in the food industry to inhibit the growth and activity of clostridia. Preferred embodiments of the invention include the use of *Lactobacillus rhamnosus* in prevention of butyric acid fermentation and in cheese production.

16 Claims, No Drawings

INHIBITION OF CLOSTRIDIA WITH LACTIC ACID BACTERIA

This application is a continuation, of application Ser. No. 08/404,571, filed Mar. 15, 1995, now abandoned.

FIELD OF THE INVENTION

The present invention relates to inhibition of clostridia with lactic acid bacteria. In particular, the invention relates to the use of *Lactobacillus rhamnosus* in the food industry to inhibit the growth and activity of clostridia.

BACKGROUND OF THE INVENTION

Clostridia are gram-positive, anaerobic, sporeforming bacteria with a fermentative metabolism. Clostridia are very effective producers of gas ($H_2$ and $CO_2$); their other fermentation products include butyric acid, acetic acid, butanol, ethanol, isopropanol, acetone and other organic acids and alcohols. Clostridia are also the principal agents of the anaerobic decomposition of proteins. The soil and water are the primary environment of clostridia, although they also may be present in poor-quality silage, feeds, fertilizers and contaminated foods, such as vegetables, fish, and crustaceans, meat, milk, and sweets.

Certain clostridia have been found to be pathogenic. Pathogenic clostridia are also normally found in the soil. They have little invasive power, but instead they produce a variety of highly toxic proteins known as exotoxins, and clostridial diseases are a result of such exotoxins. Examples of diseases caused by clostridia include botulism and other less hazardous food poisonings, which are specifically a result of the exotoxins formed in the food. Other severe clostridial diseases include tetanus and gas gangrene, resulting from wound infections. Some clostridial toxins, such as those responsible for botulism and tetanus, are potent inhibitors for nerve function. Others again, such as those causing gas gangrene, are enzymes. Such enzymes include lecithinase, hemolysin and a variety of different proteases.

In addition to being pathogenic, clostridia are also otherwise harmful. The shelf-life and utility of foods and their raw materials is often impaired by clostridial spoilage. Clostridia spoil not only food consumed fresh or employed as raw material in the food industry but also products of the food industry, such as products of the canning industry, processed meat, milk products, etc. The effects of clostridia on food have been described in W. C. Frazier, *Food Microbiology*, 2nd edition, 1967, McGraw-Hill Book Company, New York.

Clostridia may also present problems in food production. Particularly in the dairy industry, the adverse effects of food-borne clostridia are great. Hence one of the greatest problems attending cheese production is false fermentation caused by clostridia during the curing of cheese. Clostridia use for example available carbohydrates and lactic acid from normal lactic acid fermentation, producing therefrom butyric acid and gases, particularly $H_2$ and $CO_2$. Such butyric acid fermentation will completely spoil the cheese. On account of excessive gas formation, the texture of the cheese changes, the cheese swells too much and may even explode. The butyric acid formed in cheese has a very strong and unpleasant taste, and thus the cheese is not accepted for vending on account of the foul off-taste.

Various means are employed in an attempt to inhibit the growth of clostridia. Nitrate and nitrite in the form of various alkali salts are used to inhibit clostridial growth for example in meat and meat products and in certain cheese varieties. However, nitrates and nitrites are toxic at high concentrations, and their use as additives is not desired. In view of the consumer attitudes that are increasingly against the use of additives and the different food legislations in different countries, industry in general currently strives to find natural biopreservatives to replace chemical additives.

Heat treatment, such as sterilization of foods or their raw materials, has also been employed in an attempt to inhibit clostridial growth. Spores formed by clostridia are nevertheless thermostable, and in the worst case heat treatment can even have the opposite effect. In the dairy industry, problems are also presented by the fact that pasteurization of milk kills other acid-forming bacteria, and thus clostridia which do not normally grow very well at low temperatures and on the other hand do not compete well with other acidforming bacteria at higher temperatures have no competing organisms after the spores have germinated.

To avoid problems caused by clostridia, it is attempted to keep the clostridial spore content in milk as low as possible by completely prohibiting the use of silage or by using silage of very high quality only. Clostridial spores can also be bactofugated from milk prior to the use of the milk as such or as a raw material in the dairy industry. Bactofugation, i.e. removal of bacteria and/or spores by centrifugation, nevertheless has various effects on the quality of the final product and is also uneconomic.

To inhibit the growth of clostridia, the enzyme lysozyme has also been used in several branches of the food industry. The activity of lysozyme is not confined to harmful microbes only, but lysozyme also inhibits the activity and growth of any desired bacteria. Thus such a treatment also affects the quality of the final products and is not recommended for use.

Lactic acid bacteria are known to produce various antimicrobial compounds, such as organic acids, hydrogen peroxide, diacetyl and bacteriocins, and it has been attempted to use these as additives for instance to improve the shelf-life of food. Commercially available is the product Nisaplin (Aplin & Barrett), incorporating purified nisin produced by the bacterium *Lactococcus lactis* and exerting an effect against gram-positive bacteria. The use of nisin to control the growth of *Clostridium botulinum* spores in high moisture content cheese spreads is described in U.S. Pat. No. 4 584 199. U.S. Pat. No. 4 790 994 discloses the use of *Pediococcus pentosaceus* to inhibit the growth of psychrotrophic bacteria in milk products of e.g. the cottage cheese type. There is no reference to clostridia in this patent.

WO Patent publication 93/09676 relates to a method for preserving a food product by treating the product with an euhygienic bacterial strain competitively inhibiting the growth of pathogenic and spoilage organisms prior to packaging of the product. Euhygienic bacteria are defined as non-pathogenic and/or non-spoilage bacteria. *Lactobacillus delbrückii* and *Hafnia alvei* are stated as preferred. However, the effect of these species has not been shown in the publication.

European published application 344 786 (A2) discloses a bacterial preparation incorporating a *Lactobacillus gasseri, Lactobacillus delbrückii* and/or *Bifidobacterium longum* culture in a suitable medium, such as soy milk, which according to the publication can be used to inhibit clostridial growth. The publication indicates that the preparation can be used both therapeutically, to inhibit intestinal clostridial growth, and as a food preservative, in which case the preparation is used to increase the acidity of the product. However, the anticlostridial effect of said bacteria has not been demonstrated.

DE Offenlegungsschrift 31 25 797 (A1) discloses a dietetic preparation comprising *Lactobacillus casei* in a suitable culture medium, such as soy milk, which in accordance with the publication can be used to inhibit intestinal clostridial growth. The publication indicates that the preparation can, like other similar lactic acid bacteria preparations, also be used for prophylaxis for example in undergoing antibiotic therapy. However, the publication provides no test results of the anticlostridial effects of the dietetic preparation or the *Lactobacillus casei* culture incorporated therein, and there is no proof of the effectiveness of the invention. Neither is any other utility for *Lactobacillus casei* described or suggested in the publication.

BRIEF DESCRIPTION OF THE INVENTION

It was an object of the present invention to find novel solutions to problems caused by clostridia. In that connection, special attention was paid to the problems presented by clostridia in the food industry. In particular, it was attempted to find a solution to the question how butyric acid fermentation could be prevented.

When the effect of the antimicrobial factors of various lactic acid bacteria and other bacteria on the growth of clostridia was studied, it was unexpectedly found that *Lactobacillus rhamnosus* has an excellent anticlostridial effect. The microorganism *Lactobacillus rhamnosus* LC-705, DSM 7061, was particularly advantageous in its anticlostridial effect.

Thus the present invention relates to the use of *Lactobacillus rhamnosus* in the food industry to inhibit the growth and activity of clostridia.

A particularly preferred embodiment of the invention involves the use of the strain *Lactobacillus rhamnosus* LC-705, DSM 7061, in the food industry to inhibit the growth and activity of clostridia.

*Lactobacillus rhamnosus* LC-705 was deposited on May 13, 1992, as DSM 7061, at DSM DEUTSCHE SAMMLUNG VOON MIKROORGANISMEN UND ZELLKULTUREN GmbH, Mascheroder Weg 1B, D-3300 Braunschweig and was accorded Accession Number DSM 7061.

The present invention also relates to a method for inhibiting the growth and activity of clostridia in a food product, the method being characterized in that *Lactobacillus rhamnosus* is added to the food product for inhibition of clostridia. The method of the invention preferably employs *Lactobacillus rhamnosus* LC-705, DSM 7061.

The present invention further relates to a method for preventing butyric acid fermentation, the method being characterized in that *Lactobacillus rhamnosus* is used to inhibit the activity of clostridia. The method of the invention preferably employs *Lactobacillus rhamnosus* LC-705, DSM 7061.

DETAILED DISCLOSURE OF THE INVENTION

The present invention, therefore, relates to the use of *Lactobacillus rhamnosus* in the food industry to inhibit the growth and activity of clostridia and to prevent butyric acid fermentation.

The concept of food industry should be broadly construed in this context, since it is considered to mean besides the conventional food industry, such as the dairy industry, canning industry, meat industry and sweets industry, also the feeds industry, for example, i.e. all branches of industry the products of which are ingestible by humans or animals. In addition to actual industrial products, in the present context this concept also refers to raw materials used in these industries and to foods consumed fresh, such as vegetables, milk, etc.

The basis underlying the invention and the practical implementation thereof will be described in the following, using as an exemplary organism *Lactobacillus rhamnosus* LC-705, available at the microorganism collection of Valio Oy by product number LC705. The strain has been deposited on May 13, 1992 with Deutsche Sammlung von Mikroorganismen und Zellkulturen GmbH (DSM) by number DSM 7061, and has the following characteristics:

gram-positive short chain-forming rod homofermentative good growth at 15–45° C.

no proteolytic activity does not produce ammonia from arginine catalase-negative when grown in an MRS broth (LAB M), the strain produces 1.6% lactic acid having an optical activity of the L(+) configuration; the strain decomposes citrate (0.169%), producing diacetyl and acetoin; the strain ferments at least the following carbohydrates (sugars, sugar alcohols): ribose, galactose, D-glucose, D-fructose, D-mannose, L-sorbose, rhamnose, mannitol, sorbitol, methyl-D-glucoside, N-acetylglucosamine, amygdalin, arbutin, esculin, salicin, cellobiose, maltose, lactose, sucrose, trehalose, melezitose, gentiobiose, D-turanose and D-tagatose survives well a salinity of 5% and fairly well a salinity of 10%.

*Lactobacillus rhamnosus* has been described in detail in Finnish Patent Application 922699, which relates to that strain and its use for inhibition of yeasts and moulds. There is no suggestion of the use of this strain for inhibition of clostridia in the literature in this field.

In addition to the above preferred strain, other *Lactobacillus rhamnosus* strains suitable for the purposes of the invention and having an anticlostridial effect may naturally also be employed. An example of these is *Lactobacillus rhamnosus* LC-10, available at the microorganism collection of Vallo Oy by product number 706. Also other bacterial strains having utility in accordance with the invention will be found at depositary institutions for microorganisms and in their published catalogues. After the disclosure of the present invention, it is obvious to those skilled in the art to test for the anticlostridial effect of other bacterial strains by simple screening.

In accordance with the invention, a *Lactobacillus rhamnosus* strain, preferably the strain *Lactobacillus rhamnosus* LC-705, is employed for inhibition of clostridia in the food industry. Depending on the situation, the above strain is added either to the fresh food, to foodstuffs used as raw materials in the food industry, or in conjunction with the food production process.

The *Lactobacillus rhamnosus* strain can be prepared for use as a fresh culture, diluted from a stock culture, or used in the form of a lyophilizate reconstituted either prior to use or upon use. The fresh culture can be prepared in the conventional manner, for example by culturing the strain in a whey-based medium for 2 to 3 days at a temperature of 30–37° C. with or without pH adjustment. For example, the preparation of *Lactobacillus rhamnosus* LC-705 has been described in detail in the above Finnish application 922699, incorporated herein by reference. The cell-containing fermentation broth is recovered and can be used as such, concentrated, or lyophilized. The lyophilization is performed by conventional methods. The concentration may be carried out with microfiltration apparatus or by other corresponding methods.

If desired, other bacteria or additives for inhibition of clostridia may be added to the preparation incorporating Lactobacillus rhamnosus cells, prepared as described above. When bacteria are employed, such another bacterial strain can be cultured either simultaneously with or separately from the Lactobacillus rhamnosus strain. Simultaneous culturing of the strains is of advantage on account of its simplicity and ease. On the other hand, separate culturing of the strains makes it possible to vary the proportions of the strains to be included in the bacterial preparation, if desired.

program simulating a cheesemaking process, whereafter the samples were transferred to +20° C. The clostridia contents were determined either on Reinforced Clostridial Agar (R.C.M., Lab 23) by the plating method or in Tyrobutyricum Broth (Merck 11734) by the Most Probable Number (MPN) technique. A sample incorporating *Clostridium tyrobutyricum* K8 only was employed as a control. The results are shown in Table 1.

TABLE 1

Anticlostridial effect of *Lactobacillus rhamnosus* LC-705 strain

*Clostridium tyrobutyricum* K8 contents, CFU/ml

|   |   | 0 h | 2 days | 14 days | 23 days | 39 days | 60 days |
|---|---|---|---|---|---|---|---|
| 1. | LC-705 1% | $9.8 \times 10^3$ | $4.9 \times 10^3$ | <10 | <10 | <10 | <10 |
| 2. | Control K-K8 | $8.6 \times 10^3$ | $1.1 \times 10^3$ | $1.8 \times 10^4$ | $2.4 \times 10^5$ | $2.3 \times 10^4$ | $8.1 \times 10^4$ |

It is naturally also possible to use lyophilized preparations of several bacteria, which are reconstituted together or separately.

Even when the *Lactobacillus rhamnosus* preparation employed contains no other substances, it is naturally possible to employ other substances as well, such as other substances employed in food processes and other anticlostridial agents, in connection with use of *Lactobacillus rhamnosus* in accordance with the invention. For example in the dairy industry, the *Lactobacillus rhamnosus* strain used in accordance with the invention may be employed as one starter organism to replace other normal starter organisms in the particular process or in addition to them.

The *Lactobacillus rhamnosus* strain is used in a quantity sufficient to achieve the desired effect, i.e. inhibition of clostridia. The quantity employed naturally varies with application. The suitable amount can be easily determined for each implementation.

An anticlostridial *Lactobacillus rhamnosus* strain, preferably *Lactobacillus rhamnosus* LC-705, can be employed to prevent problems caused by clostridia in a number of different fields, for instance to prevent clostridial spoilage in products of the food industry and fodder industry, and to inhibit the growth of clostridia and prevent clostridia-related false fermentation during preparation processes of food and fodder. In addition to the use disclosed herein for *Lactobacillus rhamnosus*, it is naturally also possible to employ strains of *Lactobacillus rhamnosus* for medical purposes.

The invention will be described in greater detail by means of the following examples. The examples are only intended to illustrate the invention and are in no way to be construed as restricting its scope.

EXAMPLE 1

Inhibition of clostridia with *Lactobacillus rhamnosus* LC-705 strain

The test series was conducted with milk prepared from 10% milk powder (à 50 ml). The milk samples were inoculated with a spore suspension of the strain *Clostridium tyrobutyricum* K8 isolated from cheese and the *Lactobacillus rhamnosus* LC-705 strain. Clostridia were added to the milk to give an initial clostridial content of about 1000 CFU/ml. Lactobacilli were added from a culture grown in a 1% whey broth for 48 hours. The samples containing clostridium and lactobacillus inoculum were run through a The results show that *Lactobacillus rhamnosus* LC-705 exhibits an excellent anticlostridial effect.

EXAMPLE 2

Inhibition of clostridia with different Lactobacillus strains

The tests described in Example 1 were repeated employing the following strains of lactobacilli:

1. *Lactobacillus rhamnosus* LC 705 (DSM 7061)
2. *Lactobacillus rhamnosus* LC-10 (Valio 706)
3. *Lactobacillus plantarum* NRRL-B-193
4. *Lactobacillus plantarum* Lb 329–6 (Valio)
5. *Clostridium tyrobutyricum* K8 control.

Also in these tests the milk samples were inoculated with a spore suspension of *Clostridium tyrobutyricum* K8 isolated from cheese. Clostridia were added to the milk to give an initial clostridia content of about 1000 CFU/ml. Milk with added clostridium spores but with no added Lactobacillus strain was employed as a control. Lactobacilli were added from a culture grown in a 1% whey broth for 48 hours. The samples containing clostridium and lactobacillus inoculum were run through a program simulating a cheesemaking process, whereafter the samples were transferred to +200° C. The clostridia contents were determined either on Reinforced Clostridial Agar (R.C.M., Lab 23) by the plating method or in Tyrobutyricum Broth (Merck 11734) by the MPN (Most Probable Number) technique. The results are shown in Table 2.

TABLE 2

Anticlostridial effect of *Lactobacillus* strains

*Clostridium tyrobutyricum* K8 contents, CFU/ml

|   | 0 h | 13 days | 26 days | 40 days | 52 days | 60 days |
|---|---|---|---|---|---|---|
| LC-705 | 1000 | <10 | <10 | <10 | <10 | <10 |
| LC-10 | 1000 | 1600 | 4000 | 5600 | $3.1 \times 10^4$ | 1300 |
| NRRL-B | 1000 | $3.2 \times 10^4$ | nt | $1.4 \times 10^4$ | $2.3 \times 10^4$ | $1.4 \times 10^4$ |
| Lb 329-6 | 1800 | $1.2 \times 10^6$ | nt | $7.9 \times 10^6$ | $9.5 \times 10^6$ | $1.0 \times 10^7$ |
| K-K8 | 800 | $1.4 \times 10^7$ | $5.6 \times 10^7$ | $6.8 \times 10^7$ | $1.7 \times 10^7$ | $1.0 \times 10^6$ |

The results show that *Lactobacillus rhamnosus* LC-705 is the most advantageous of the studied strains; it has an excellent inhibitory effect on the growth of clostridia. Also the other *Lactobacillus rhamnosus* strain performed better than the studied *Lactobacillus plantarum* strains, and thus *Lactobacillus rhamnosus* strains are advantageous for use in accordance with the invention.

EXAMPLE 3

Use of *Lactobacillus rhamnosus* LC-705 strain as a starter in preparing Swiss cheese Normal Swiss cheese starters were employed in the cheese preparation. In addition, 0.3% of a *Lactobacillus rhamnosus* LC-705 culture was added to the test cheeses. The amount may vary according to cheese variety and clostridial spore content. A suitable amount may be for example 1–40 1/11000 1 of cheese milk or 0.01–0.4%/ cheese kettle. Ten clostridium spores per litre of milk were added to two test cheeses. The spores were *Clostridium tyrobutyricum* spores, the quantity employed being known to produce butyric acid fermentation.

The LC-705 starter was grown in the cheese dairy as a normal starter; 1% of culture was inoculated into the milk and grown at 37° C. for 24 h. After culturing, the lactobacillus content was about 3–5×10$^8$/ml and the acidity was about 20–25° SH.

The clostridial, lactic acid, acetic acid, citric acid and butyric acid content and pH of the cheeses were determined during the first week at one-day intervals and thereafter at intervals of one week. Prepared cheeses that had ripened for three months were also evaluated in the conventional way by normal quality control, which in addition to chemical analyses also included organoleptic evaluation. The results after five days and six weeks are shown in Tables 3 and 4.

TABLE 3

Effect of *Lactobacillus rhamnosus* on cheese quality

| | Additions | | Swiss cheese, 5 days | | | | |
|---|---|---|---|---|---|---|---|
| batch No. | LC-705 | *clostr.* | *clostridia*/ g | lactic acid % | acetic acid mg/100 g | citric acid % | pH |
| 1. | − | − | <3 | 1.19 | 36 | 0.11 | 5.52 |
| 2. | + | − | <3 | 1.27 | 116 | <0.02 | 5.46 |
| 3. | − | + | 9 | 1.21 | 39 | 0.10 | 5.49 |
| 4. | + | + | <3 | 1.27 | 122 | <0.02 | 5.42 |

TABLE 4

Effect of *Lactobacillus rhamnosus* on cheese quality

| | Additions | | Swiss cheese, 5 days | | | | |
|---|---|---|---|---|---|---|---|
| batch No. | LC-705 | *clostr.* | *clostridia*/ g | lactic acid % | acetic acid mg/100 g | butyric acid % | pH |
| 1. | − | − | <100 | | | | |
| 2. | + | − | <100 | | | | |
| 3. | − | + | 2800 | 0.70 | 130 | 15 | 5.95 |
| 4. | + | + | <100 | 1.13 | 150 | 3 | 5.62 |

The results show that clostridia can be detected in cheeses with added clostridia but with no added LC-705 starter as early as after five days. After six weeks, the clostridia content is distinctly higher in cheese prepared with added clostridia than in cheese prepared with a corresponding addition but also having LC-705 starter added. The amount of butyric acid in the cheese with a clostridia addition is above the gustative limit.

The results for ripened cheeses are shown in Table 5.

TABLE 5

Effect of *Lactobacillus rhamnosus* on cheese quality

| | | | | Swiss cheese, 3 months | | | | |
|---|---|---|---|---|---|---|---|---|
| | Additions | | entero- | | lactic | acetic | propionic | butyric | organo- |
| batch No. | LC-705 | clostr. | clostr./ g | cocci/ g | acid % | acid mg/100 g | acid mg/100 g | acid mg/100 g | leptic evaluation |
| 1. | − | − | <10 | 5 × 10$^5$ | 0.30 | 280 | 400 | 6 | normal |
| 2. | + | − | <10 | 8 × 10$^3$ | 0.55 | 290 | 300 | 4 | normal |
| 3. | − | + | 17 000 | 4 × 10$^6$ | 0.22 | 290 | 400 | 60 | butyric acid fermentation |
| 4. | + | + | <10 | 8 × 10$^2$ | 0.61 | 300 | 310 | 5 | normal |

The milk used for the tests was of an excellent quality and did not contain clostridia to such an extent as to induce natural butyric acid fermentation in the cheeses. The cheeses which have added clostridia only show butyric acid fermentation. On the other hand, the cheeses which along with added clostridia also have added LC 705 starter show no butyric acid fermentation. The LC 705 starter thus clearly inhibits clostridial growth and prevents butyric acid fermentation. The LC 705 starter also inhibits the growth of enterococci in cheese. Enterococci are part of the natural bacterial flora that comes into the cheese from milk and from the cheese dairy. They are indicative of the level of hygiene, and thus their content should be as low as possible. Hence this positive effect is also worth paying attention to.

Also the results of chemical and organoleptic evaluation support the above microbiological results.

EXAMPLE 4

Use of *Lactobacillus rhamnosus* LC-705 strain to replace nitrate in cheese production In this test, an LC 705 starter was used to replace nitrate in the production of Edam cheese. Clostridia were added into the cheese milk (20 spores/1 l of milk) in order to assure butyric acid fermentation.

The LC 705 starter was grown as described in Example 3 and added into kettle milk along with other normal starters in an amount of 0.3–0.35%. The amount added may vary according to need. The results for kettle milk and cheeses five days old are shown in Tables 6 and 7. The results for ripened Edam cheeses six weeks old are shown in Table 8.

TABLE 6

Effect of *Lactobacillus rhamnosus* on cheese quality

| | Additions | | | Kettle milk | |
|---|---|---|---|---|---|
| batch No. | nitr. | LC-705 | clostr. | clostr./g | pH |
| 1. | + | − | − | <0.3 | 4.67 |
| 2. | + | − | + | 2.3 | 4.65 |
| 3. | − | + | − | <0.3 | 4.64 |
| 4. | − | + | + | 9.3 | 4.64 |

TABLE 7

Effect of *Lactobacillus rhamnosus* on cheese quality

| | Additions | | | Edam cheese, 5 days | | | |
|---|---|---|---|---|---|---|---|
| batch No. | nitr. | LC-705 | clostr. | clostr./ g | lactic acid % | butyric acid mg/100 g | pH |
| 1. | + | − | − | <3 | 1.18 | 0.5 | 5.40 |
| 2. | + | − | + | <3 | 1.19 | 0.5 | 5.39 |
| 3. | − | + | − | <3 | 1.21 | 0.5 | 5.39 |
| 4. | − | + | + | <3 | 1.19 | 0.5 | 5.40 |

TABLE 8

Effect of *Lactobacillus rhamnosus* on cheese quality

| | Additions | | | Edam cheese, ripened | | | |
|---|---|---|---|---|---|---|---|
| batch No. | nitr. | LC-705 | clostr. | clostr./ g | lactic acid % | butyric acid mg/100 g | pH |
| 1. | + | − | − | <3 | 1.19 | 4 | 5.52 |
| 2. | + | − | + | <3 | 1.18 | 3 | 5.54 |
| 3. | − | + | − | <3 | 1.25 | 2 | 5.45 |

TABLE 8-continued

Effect of *Lactobacillus rhamnosus* on cheese quality

| batch No. | Additions | | | Edam cheese, ripened | | | |
|---|---|---|---|---|---|---|---|
| | nitr. | LC-705 | *clostr.* | *clostr.*/g | lactic acid % | butyric acid mg/100 g | pH |
| 4. | − | + | + | <3 | 1.24 | 3 | 5.47 |

Thus the effectiveness of the LC-705 starter in preventing butyric acid fermentation in all test cheeses is equal to or even better than that of nitrate.

We claim:

1. A method for inhibiting the growth or activity of clostridia in food comprising adding *Lactobacillus rhamnosus* LC-705, DSM 7061, to a food product which is susceptible to infection by clostridia in an amount effective for inhibiting the growth or activity of clostridia.

2. The method according to claim 1, wherein the food product is ingestible by humans or animals.

3. The method according to claim 2, wherein the food product is a dairy product, a canned food product, a meat, a sweet or a feed product.

4. The method according to claim 3, wherein the food product is cheese.

5. The method according to claim 4, wherein the *Lactobacillus rhamnosus* LC-705, DSM 7061, is added during production of the cheese.

6. A method for preventing butyric acid fermentation in a food product comprising adding *Lactobacillus rhamnosus* LC-705, DSM 7061, to a food product which is susceptible to infection by clostridia in an amount effective for preventing butyric acid fermentation.

7. The method according to claim 6, wherein the food product is ingestible by humans or animals.

8. The method according to claim 7, wherein the food product is a dairy product, a canned food product, a meat, a sweet or a feed product.

9. The method according to claim 8, wherein the food product is cheese.

10. The method according to claim 9, wherein the *Lactobacillus rhamnosus* LC-705, DSM 7061, is added during production of the cheese.

11. A method for preparing cheese comprising adding *Lactobacillus rhamnosus* LC-705, DSM 7061, to a cheese starter composition in an amount effective to inhibit the growth or activity of clostridia.

12. A food product comprising a food which is susceptible to infection by clostridia which contains an amount of *Lactobacillus rhamnosus* LC-705, DSM 7061, effective to inhibit the growth or activity of clostridia.

13. The food product according to claim 12, wherein the food product is ingestible by humans or animals.

14. The food product according to claim 13, wherein the food product is a dairy product, a canned food product, a meat, a sweet or a feed product.

15. The food product according to claim 14, wherein the food product is cheese.

16. A method for preparing cheese comprising adding *Lactobacillus rhamnosus* LC-705, DSM 7061, to kettle milk in an amount effective to inhibit the growth or activity of clostridia.

* * * * *